Figures 1, 2, 3:
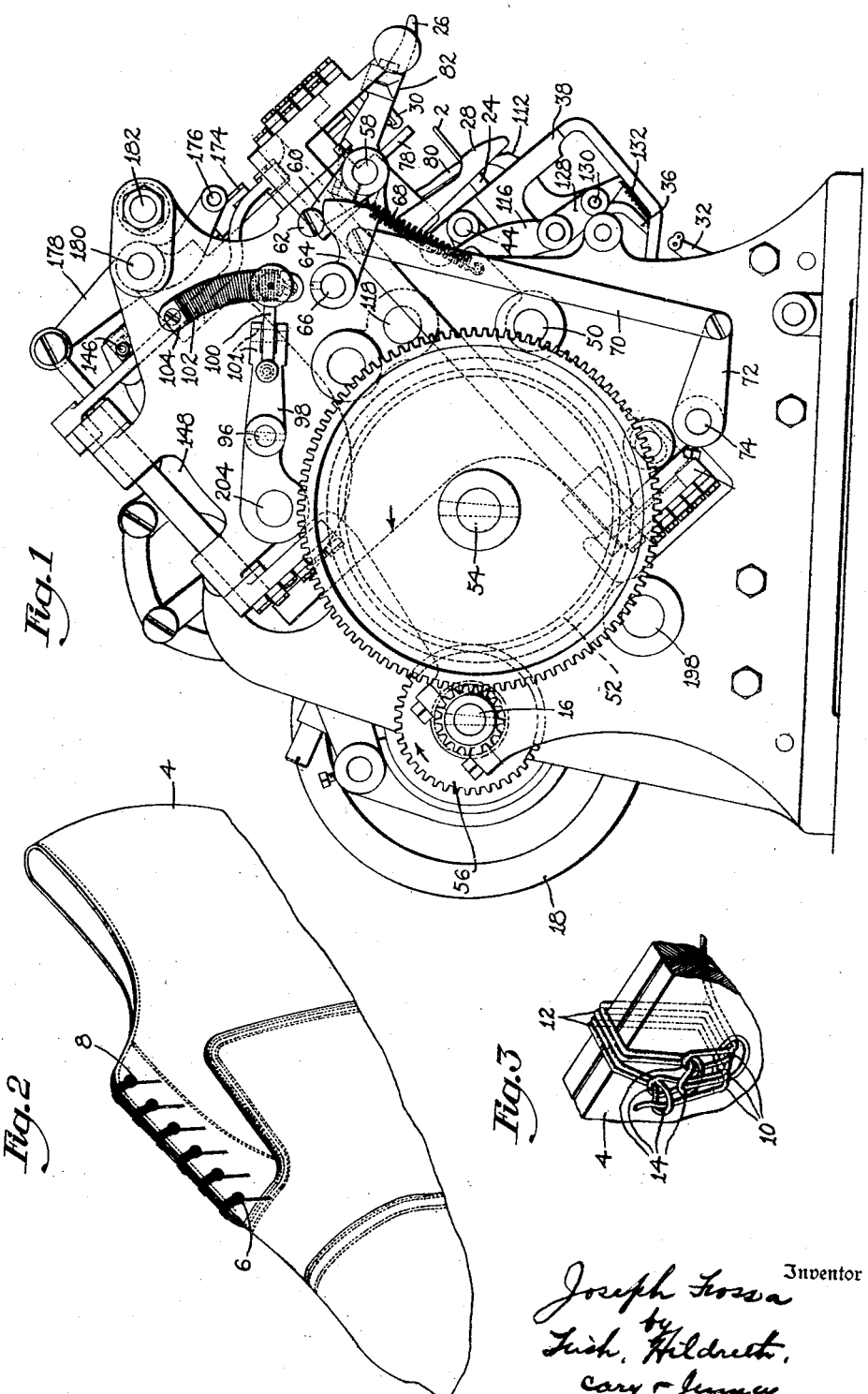

Oct. 3, 1939.                    J. FOSSA                    2,175,055
                        METHOD OF LACING SHOE UPPERS
            Original Filed May 11, 1935      11 Sheets-Sheet 1

Inventor
Joseph Fossa
by
Fish, Hildreth,
Cary & Jenney   Attorneys

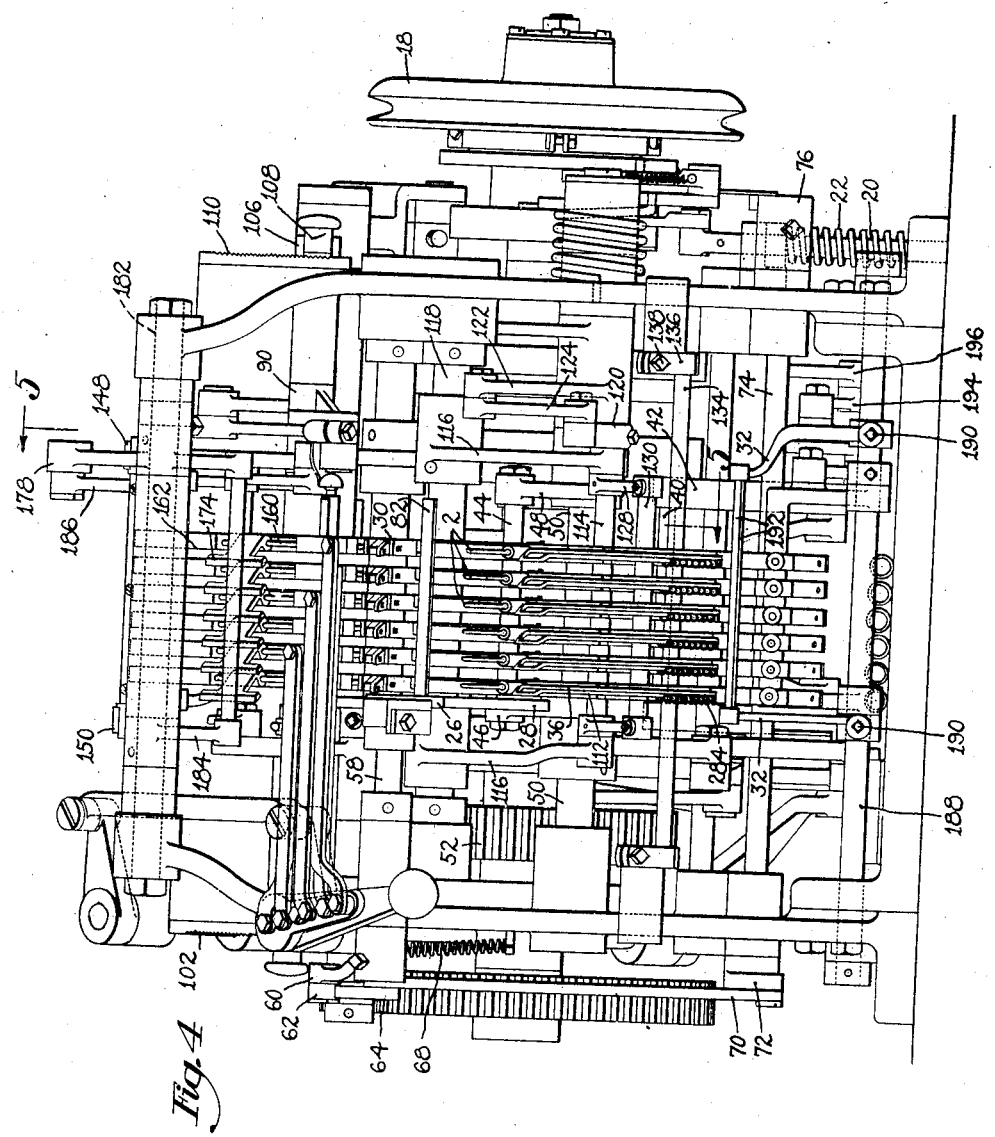

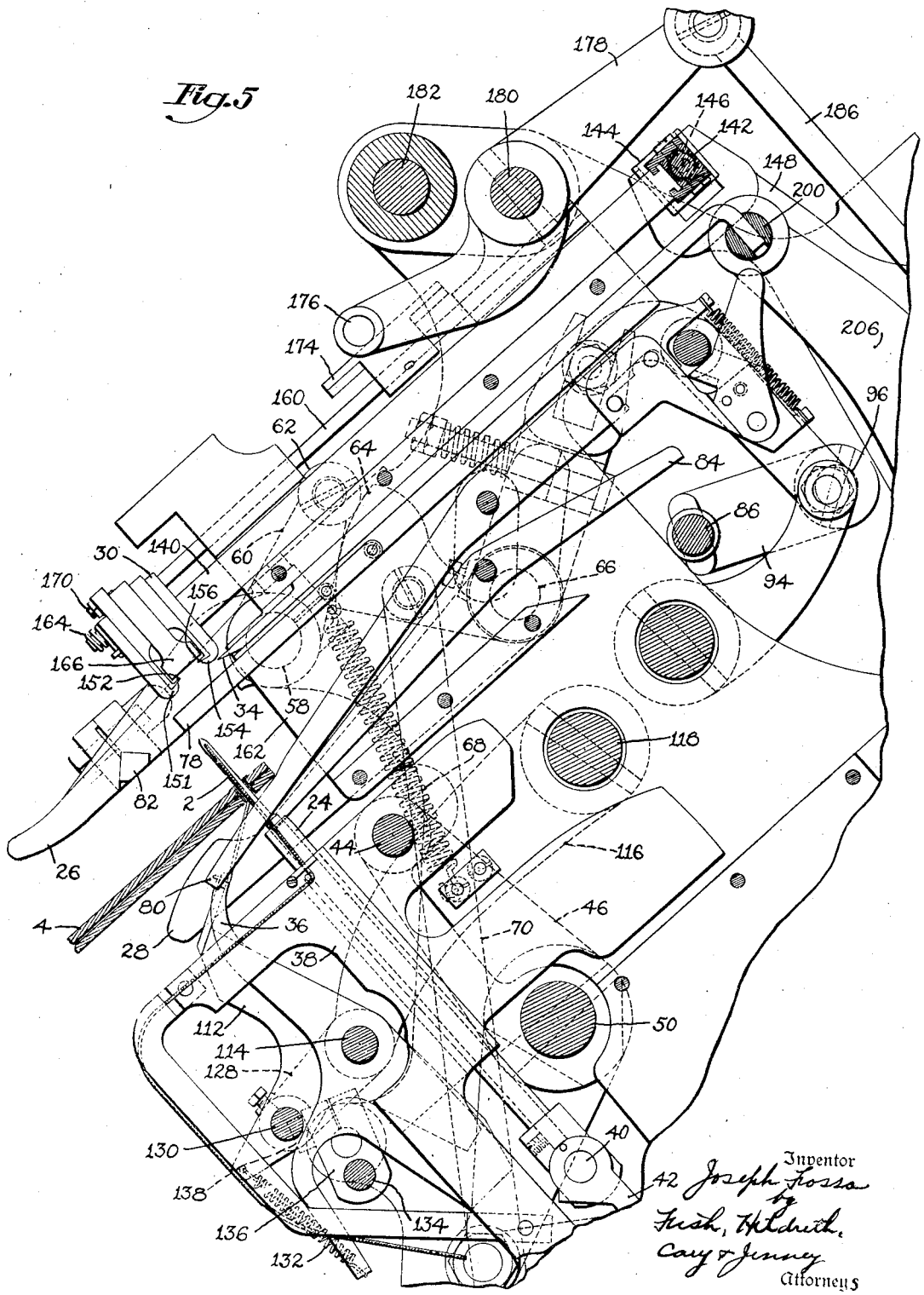

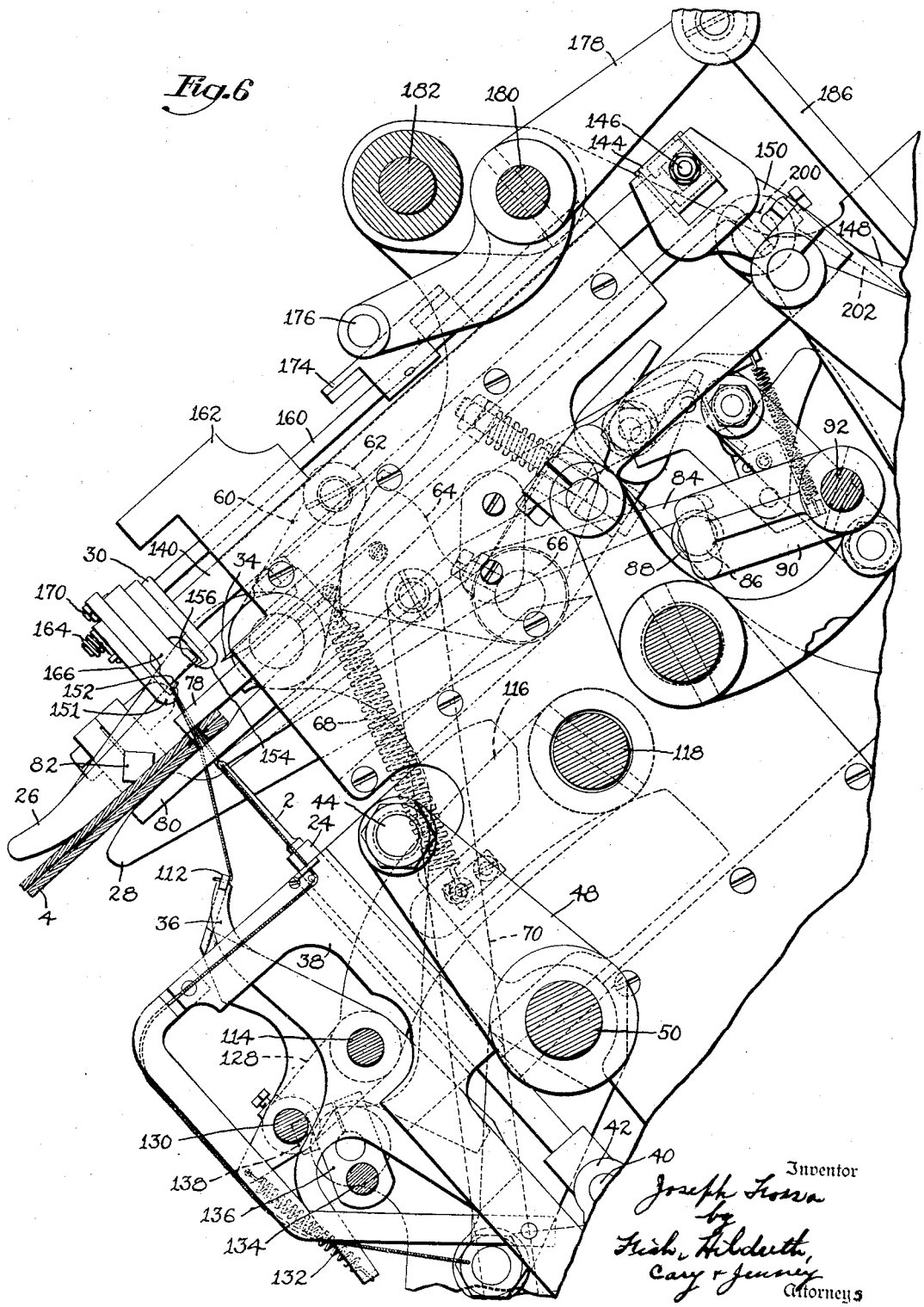

Oct. 3, 1939.　　　　J. FOSSA　　　　2,175,055
METHOD OF LACING SHOE UPPERS
Original Filed May 11, 1935　　11 Sheets-Sheet 5
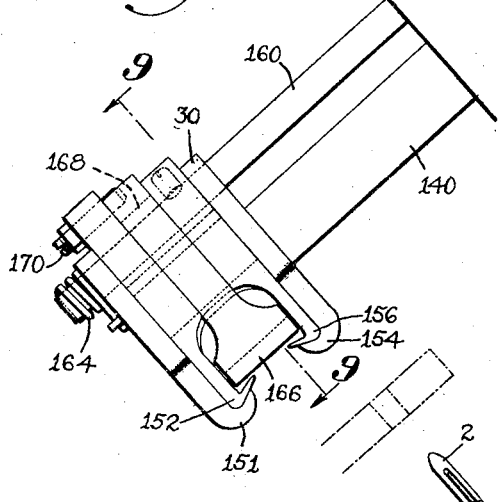
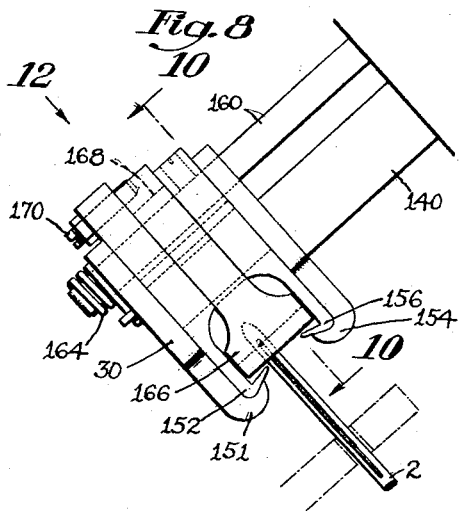
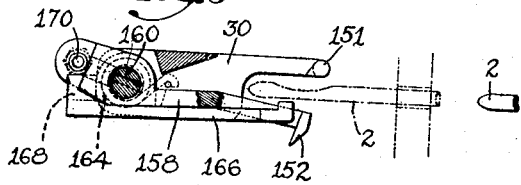
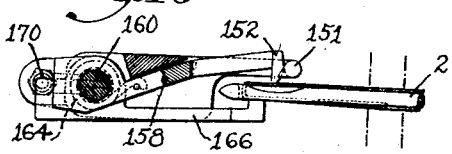
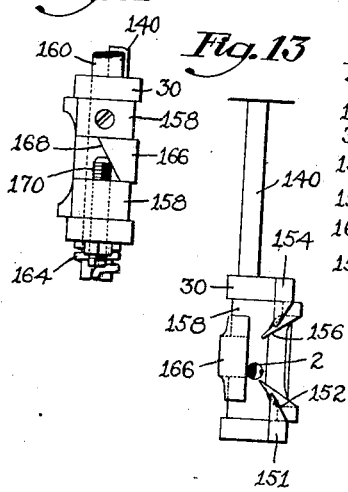
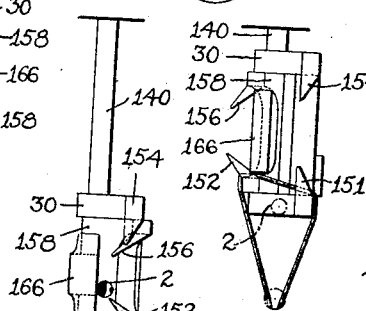
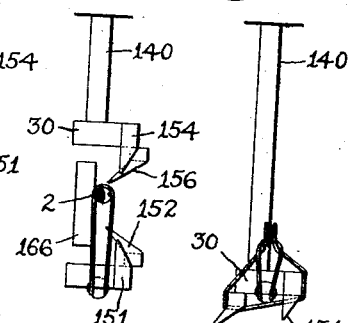

Oct. 3, 1939.   J. FOSSA   2,175,055
METHOD OF LACING SHOE UPPERS
Original Filed May 11, 1935   11 Sheets-Sheet 6

Inventor
Joseph Fossa
by
Fish, Hildreth, Cary & Jenney
Attorneys

Oct. 3, 1939.   J. FOSSA   2,175,055
METHOD OF LACING SHOE UPPERS
Original Filed May 11, 1935    11 Sheets-Sheet 7

Inventor
Joseph Fossa
by
Fish, Hildreth, Cary & Jenney
Attorneys

Oct. 3, 1939.  J. FOSSA  2,175,055
METHOD OF LACING SHOE UPPERS
Original Filed May 11, 1935   11 Sheets-Sheet 8

Inventor
Joseph Fossa
by
Fish, Hildreth, Cary & Jenney
Attorneys

Oct. 3, 1939.  J. FOSSA  2,175,055
METHOD OF LACING SHOE UPPERS
Original Filed May 11, 1935   11 Sheets-Sheet 9

Inventor
Joseph Fossa
by
Fish, Hildreth, Cary & Jenney
Attorneys

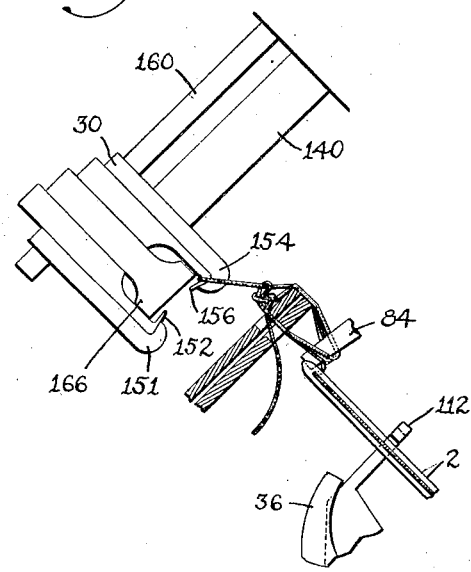
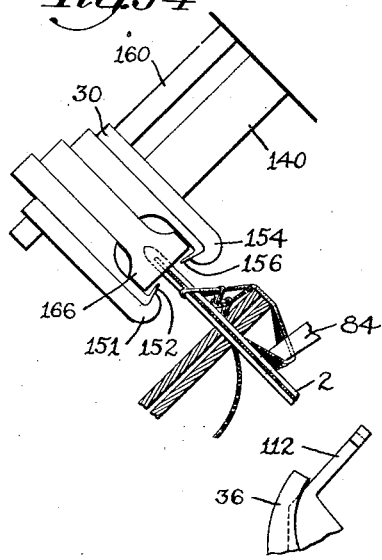
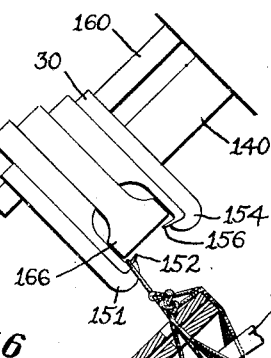
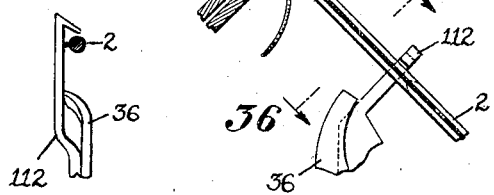
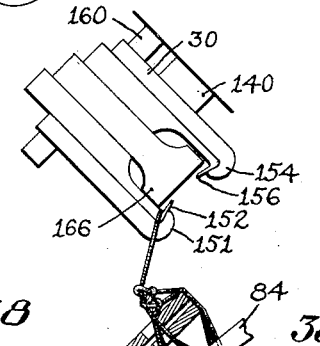
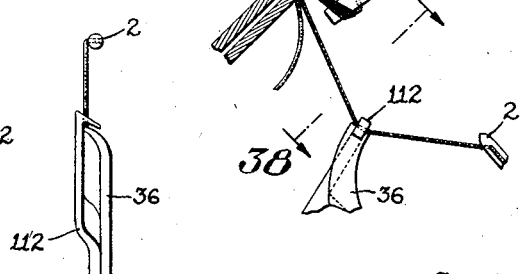

Oct. 3, 1939.  J. FOSSA  2,175,055
METHOD OF LACING SHOE UPPERS
Original Filed May 11, 1935  11 Sheets-Sheet 11
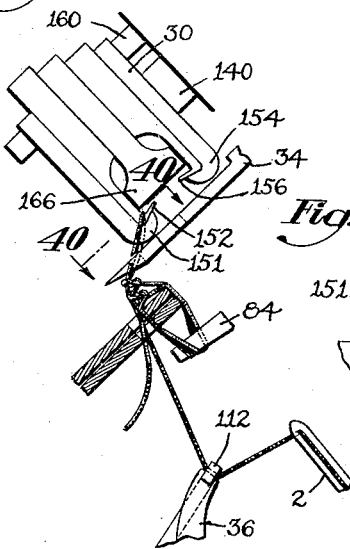
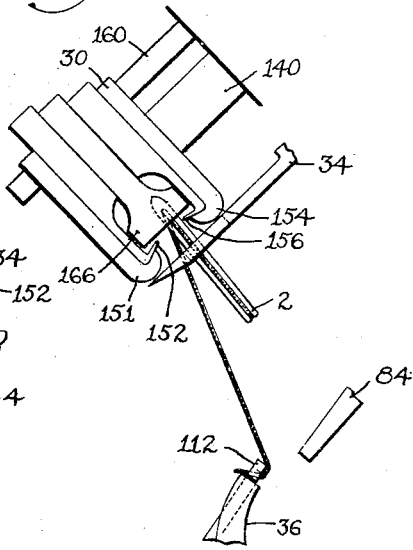
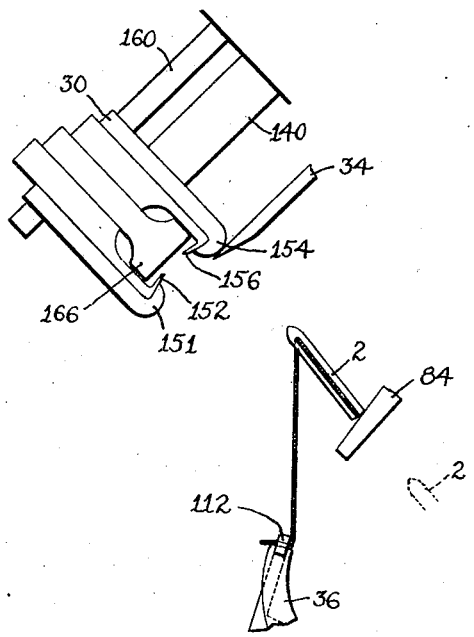
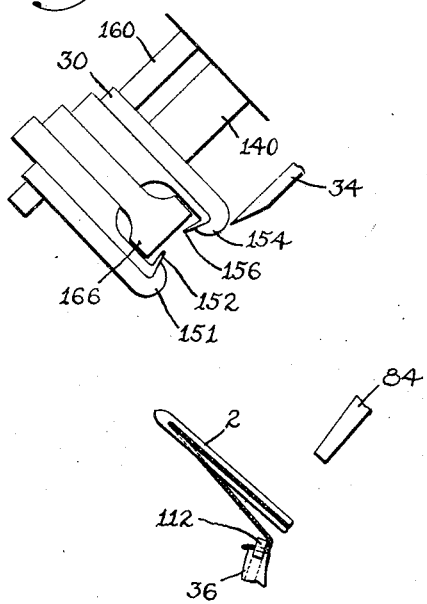
Inventor
Joseph Fossa
by
Fish, Hildreth, Cary & Jenney
Attorneys Patented Oct. 3, 1939

2,175,055

UNITED STATES PATENT OFFICE 2,175,055

METHOD OF LACING SHOE UPPERS

Joseph Fossa, Salem, Mass., assignor to United Shoe Machinery Corporation, Paterson, N. J., a corporation of New Jersey Original application May 11, 1935, Serial No. 21,011. Divided and this application July 20, 1937, Serial No. 154,602

3 Claims. (Cl. 112—262)

The present invention relates to a method of lacing shoe uppers to prepare them for the lasting operation, and is herein disclosed in connection with the shoe upper lacing machine described and claimed in inventor's pending application Serial No. 21,011, filed May 11, 1935 of which the present application is a division; said application has resulted in Patent No. 2,106,320, issued January 25, 1938.

The principal object of the invention is to provide a method of forming individual cord lacings in the eyelet holes of a shoe upper in a new and improved manner, whereby individual cord lacings may be formed accurately and with certainty having a length as short or as long as desired and capable of withstanding any strains to which the upper may be subjected in being applied to the last.

Other objects of the invention are to provide a method of forming individual cord lacings which, while extending across the edges of the shoe upper, will not chafe or mark the surface of the upper during lasting or other shoe making operations.

With the above objects in view, the present invention consists in the novel operations performed in lacing a shoe upper hereinafter described and claimed. The steps constituting the method of the present invention are such that they can advantageously be performed automatically by a suitably designed machine such, for instance, as that disclosed in applicant's pending application above referred to. In this machine the several parts are constructed and arranged so that during the normal operation of the machine in lacing a shoe upper the cords from which the lacing is formed are manipulated in accordance with the method of the present invention. A description of the principal parts of this machine and their mode of operation in lacing a shoe upper will, therefore, be sufficient to enable the method of the present invention to be clearly understood.

Referring to the accompanying drawings which illustrate so much of the machine of said pending application as is necessary for an understanding of the present invention, Figure 1 is a view in left side elevation of the machine; Figure 2 is a perspective view of a shoe upper laced according to the present invention; Figure 3 is a view illustrating, on an enlarged scale, an individual lacing of the shoe shown in Figure 2; Figure 4 is a view in front elevation of the machine shown in Figure 1; Figure 5 is a view, in section, of an upper part of the machine taken along the line 5—5 of Figure 4, with the parts of the machine in positions assumed as the machine is about to start into operation; Figure 6 is a sectional view, taken on substantially the same line as that of Figure 5, indicating the positions of parts after the first reciprocation of the needles; Figure 7 is a detail view, on an enlarged scale, illustrating one of the loopers in its lowermost position just after starting the machine; Figure 8 is a similar view, taken just after the looper has been raised, to receive the needle loop during the first needle reciprocation; Figure 9 is a sectional view of the looper shown in Figure 7, taken along the line 9—9; Figure 10 is a sectional view of the looper shown in Figure 8, taken along the line 10—10; Figure 11 is a view similar to that shown in Figure 10, illustrating a needle loop spread by the looper; Figure 12 is a detail view of the looper looking in the direction of the arrow 12 in Figure 8; Figures 13 to 16 inclusive, are similar detail views illustrating parts of the loopers in successive positions. Figures 17 to 35 inclusive are detail views illustrating successive positions of certain of the lacing devices; Figure 36 is a sectional view, taken along the line 36—36 of Figure 35; Figure 37 is a detail view illustrating the positions of the needle and looper subsequent to those shown in Figure 35; Figure 38 is a sectional view, taken along the line 38—38 of Figure 37; Figure 39 is a detail view of the needle and looper illustrating positions subsequent to those shown in Figure 37; Figure 40 is a sectional view, taken along the line 40—40 of Figure 39; Figure 41 is a detail view of the needle and looper in positions following those shown in Figure 39; Figure 42 is a detail view of the needle and looper in final operating positions of the machine just before coming to rest; and Figure 43 is a detail view of the needle and looper with the machine at rest.

The lacing machine illustrated in the drawings is arranged with a row of parallel eye-pointed needles 2 on which, while stationary, oppositely disposed aligned eyelets in the quarter portions of a folded upper to be laced are impaled by the operator. When the machine is started, the upper is gripped in its folded condition and held in the machine until the lacing is completed. Thereafter, the upper drops from the machine, and the machine is brought to rest. An upper completely laced in accordance with the present invention is shown in Figure 2 of the drawings, and comprises a plurality of separately tied lengths of cord, each having the proper amount of slack to make the upper, indicated at 4, conform in a predetermined manner with the last (not shown) the upper, when opened out and applied to the last, having the portions adjacent the lacing slit lying flat against the last. Preferably, the amount of slack in each individual lacing is made to progressively increase from the first eyelet 6 in the toe of the upper to the last eyelet 8 at the angle opening.

The nature of each indvidual lacing is more clearly illustrated in Figure 3. A length of cord is formed into a series of inter-connected loops, alternate ones 10 of which are passed through a pair of alined eyelets in opposite sides of the upper 4 and the others, 12, of which are passed across the edges of the upper. The bight portion 14 of each loop, after being passed through the eyelets or across the upper edges, is drawn through the bight of the previously formed loop to lock the loop in place and the final loop is severed along the bight portion. The severed end remaining in the machine is then withdrawn from the next to the last bight, leaving the free end of the cord forming the lacing extending through said next to last bight to lock the corresponding loop in place.

In a lacing formed as shown, two complete loops forming four strands extending across the edges have been found sufficient to prevent chafing or marring of the upper. To secure the bights of the loops together, three loops passing through the eyelets with the final loop severed and the end withdrawn, are effective to fasten the loops crossing the edges. The series of interlocking chain loops, of which the lacing is comprised, when tightened against one another, form a lacing ring which is self-sustaining independently of any support afforded by the contacting parts of the upper or spacing member 84, and is well adapted to permit the eyeleted edges of the upper to be moved relatively thereon from a parallel to a fully spread position without danger that the lacing may become untied or loosened in such a way as to interfere with the proper fitting and stretching of the upper on the last.

The machine hereinafter described is operated by a main driven shaft 16 rotating in the direction of the arrow, Figure 1, in bearings of the machine. To rotate the shaft 16, the right end of the shaft, viewing the machine from the front (Fig. 4) carries a driving and stopping mechanism for connecting and disconnecting a main driving pulley 18 loose on the shaft. The pulley 18 is connected with the shaft by depressing a treadle connected rod 20 (Fig. 4) which controls the driving and stopping mechanism. When the rod is released, a spring 22 coiled about the rod causes it to rise, bringing the main shaft to rest at the desired point.

Before applying an upper to the machine, it is folded, with eyelets at opposite sides in registration. The eyelets are then applied to the needles which are mounted in a row of inclined needle bars 24 (see Fig. 5) with the ends of the needles projecting upwardly and at an angle of about 45 degrees to the horizontal. The uppers are first held loosely in folded relation by the needles until the machine is started. In starting the machine, a pair of pivotally mounted clamp jaws 26 and 28 act against opposite sides of the upper to secure the upper in proper folded relation (Fig. 6) and remain in this position until the lacing operation is completed.

A separate lacing cord is supplied to each needle and, when the machine is at rest ready to receive the folded upper upon the needles, each lacing cord extends upwardly from the supply lengthwise of the needle through the eye of the needle, and then downwardly to a cord end gripper. When, therefore, the upper is placed in position on the needles, a cord loop extends through each pair of aligned eyelets, as indicated in Figure 5. Upon starting the machine, each needle is advanced upwardly to bring the loop on the needle into position to be engaged by a cooperating looper or loop taker and thereafter the needles are withdrawn and are given a number of up-and-down reciprocations, the reciprocations taking place alternately across the edges of the upper and through the aligned eyelets. During each upward movement of a needle, the cooperating loop taker retains the preceding loop in the path of the needle and then casts off this loop and engages the loop on the needle and retains it during the downward stroke of the needle. Each needle loop is thus passed through the preceding loop. The loop takers, of which there is one for each needle, are illustrated as secured each to its supporting block 30. Also cooperating with the needles in forming the lacings is a take-up 32 (Figs. 1 and 4) common to all the needles, a cutter knife 34 associated with each needle for severing at its bight portion the last formed needle loop, and the cord end gripper, previously mentioned, associated with each needle, one of the members of which is indicated at 36, as shown more clearly in Figs. 36 and 38.

The needle bars 24 (see Fig. 5) are mounted to slide in guideways engaging the bars, and formed in carrier 38. The central part of each needle bar is enlarged and perforated to fit a rod 40 running across the row of bars and being secured at either end to the upper ends of a pair of inclined links 42 pivotally connected at their lower ends, through connections more fully described in inventor's prior application, to a crank portion of the main shaft 16. The needles are reciprocated once by these connections for each complete rotation of the main shaft 16.

To cause the needles alternately to enter the eyelets and to pass across the edges of the upper with a jogging motion, the carriers 38 in which the bars 24 reciprocate are loosely supported at their upper ends on a horizontal rod 44 fixed at its left end to the upper arm of a lever 46, and at its right end to an arm 48, both of which are secured on a shaft 50 rotatable in the machine frame. The lower arm of lever 46 at the left (see Figs. 5 and 6) is actuated by connections to a cam slot formed in one side of a spur gear 52 (Figs. 1 and 4). The gear 52 rotates loosely on a cam shaft 54, once for every three revolutions of the main shaft 16 and meshes with a smaller gear 56 fast to the main shaft.

The upper clamp jaw 26 is secured at the right end to a horizontal shaft 58 (see Fig. 1) and is moved to a fixed position before the machine is started through connections actuated in part by the treadle rod 20, and in part by the driving and stopping mechanism. These connections comprise an arm 60 on the left end of the shaft 58, carrying a roll 62 arranged to be engaged by segmental cam 64 rotatable loosely on a horizontal shaft 66. The outer surface of the cam 64 is concentric with the shaft 66 and is terminated at its upper portion by an abrupt radial drop so that, when the cam is rotated beyond a certain point, the clamp jaw 26 may be lowered immediately upon starting and raised when the operation is completed by the action of a tension spring 68 connected between the arm 60 and the machine frame. A relatively short upward movement of the cam brings the clamp jaw into clamping position, and any further movement of the cam does not change the position of the clamp jaw. To oscillate the clamp cam 64, it is connected by a downwardly extending link 70 with an arm 72 made fast to the left end of a shaft 74 which passes loosely through the lower part of the machine frame. To the other end of the shaft 74 (Fig. 4) is secured an arm 76 connected with a part of the driving and stopping mechanism of the machine. When the treadle rod is depressed, the connections thus described cause the cam 64 to be raised and the clamp jaw 26 lowered to clamping position, in which position it is held during the operation of the machine. Immediately when starting the machine the lower clamp jaw 28 is moved yieldingly against the upper held by the upper clamp jaw 26.

To support the individual eyelets of the upper so that the needles may reenter with certainty, the machine is provided with a series of clamping members 78 and 80, arranged to grip the upper in close proximity to the eyelets operated upon. To insure that the upper may be held flat, the upper clamp jaw 26 is provided with a laterally projecting rod 82 (see Figs. 4 and 6) extending across the upper beside the row of eyelets. The lower clamping members 80 are of sufficient length to cooperate with the rod 82 in holding the upper in place throughout the row of eyelets, but the upper clamping members 78 are considerably shorter than the lower clamping members so as not to interfere with the rod 82. There is a pair of upper and lower clamping members 78 and 80 for each eyelet operated upon, and the lower clamping members engage the shoe upper between adjacent eyelets and closer to one of the eyelets than the other so as to provide maximum support for that eyelet.

To provide the requisite amount of slack in the individual cord lacings to permit the upper to be opened out for application to a last, the machine is provided with a series of cord measuring fingers 84 (see Figs. 5 and 6) which correspond in number to the needles. Each cord measuring finger lever is arranged to extend in close proximity to the under side of an upper in a position to be surrounded by a lacing as it is applied to the upper. The lower forward end of each measuring lever is bent at an angle to the edge of the upper to pass between the positions of a needle as it enters the eyelets, and as it crosses the upper edges respectively. The angle between the end of the measuring lever and the edge of the upper is approximately 60 degrees so that, after the lacing operation is completed, the lacing surrounding the measuring end of the lever will slide easily from engagement therewith.

To locate each measuring finger lever 84 in proper position, the rearward ends of the levers are brought against a transverse rod 86 by the action of the cord in being drawn tightly through the eyelets. The rod 86 is formed with one spherical end engaging a socket 88 in an arm 90 fixed to a shaft 92 rotatable in the right side of the machine frame. The other end of the rod 86 (see Fig. 5) is supported by an arm 94 similar to the arm 90. The arm 94 is fixed to the inner end of a shaft 96 rotatable in the left side of the machine and operated by an adjusting arm 98 (Fig. 1). The free end of the arm 98 is arranged to be moved in any desired angular position so as to change the position of the rod 86 by a lever 100 (see Figs. 1 and 4) pivoted within a slot in the arm through which a fulcrum screw 101 passes and formed on its under surface with corrugations 102 cooperating with corrugations in an arcuate shaped plate 104 secured to the machine frame. The outer end of the shaft 92 at the other side of the machine carries an arm 106 (see Fig. 4) provided with similar adjusting means, including a locking lever 108 on the arm and a corrugated plate 110 to hold the arm 106 in the desired angular position. By means of the arms 98 and 106, the rod 86 against which the rearward ends of the cord measuring fingers 84 are forced may be moved not only to increase or decrease the length of all the lacings equally, but also to increase or decrease progressively the length of each lacing from one end of the series of eyelets operated upon to the other.

The cord end grippers are actuable towards and from the needles 2 and also towards and from an upper secured by the clamping members in a direction parallel to the reciprocating movement of the needles. Each gripper comprises a three-armed lever 36 having a suitably shaped forward gripping end, and a cooperating cord holding hook member 112 provided with an arcuate angular end (see Figs. 36 and 38) so that, in moving rearwardly across the path of the needle (Fig. 36), it may force the cord to one side and may draw the cord into the apex of the angular end (Fig. 38) during its return movement. When the cord is properly positioned in the holding member, the member 36 may secure the cord effectively by movement against it. The gripper members are supported and slidable laterally along a horizontal carrier rod 114 (see Fig. 4) rotatably mounted at its ends in arms 116 secured to a transverse horizontal shaft 118 rotatable in the machine frame. To actuate the cord grippers towards and from the upper clamping members, the shaft 118 is rocked by a cam secured to the cam shaft 54 which rotates once during a lacing operation.

To actuate the grippers towards and from the needles, an arm 120 is secured on the right end of the rod 114 and is connected to a bell crank lever 122 by a link 124. The bell crank lever 122 is also provided with a cam actuated roll engaging a slot in a cam on the shaft 54. Rocking movement of the rod 114 actuates a pair of arms 128 (see Fig. 5) secured at the ends of the rod 114 and also to a horizontal rod 130 mounted between the forward ends of the arms 128. The rod 130 passes loosely through forwardly extending arms of the hook members 112 so that when the rod 114 is rocked, the hook members will also be rocked towards and from the needles. The gripper members 36 are caused to move with the hook members 112 by springs 132 stretched between the forward arms of the hook members and downwardly extending arms of the members 36. During the movement of the hook members towards the needles, rearwardly extending arms of the members 36 engage a horizontal rod 134 to cause the hook members to separate from the members 36 in order that the cord may pass into the hook portions of the hook members. The rod 134 is mounted at each end upon a link 136 releasably clamped by means of screws 138 to studs on the side frames of the machine.

The loop takers 30 each comprise a main frame block integral with the forward end of an inclined sliding rod 140. When the machine is at rest, the loop takers are in a retracted raised position to permit ready access to the needles in placing the folded upper in position in the machine. Upon starting the machine, the loop takers are moved downwardly and forwardly into a position to cooperate with the needles. To take the loops from the needles, retain the loops in the path of the needles during their next reciprocation, and then cast off these loops and engage the loops on the needles, the loop takers are reciprocated back and forth at right angles to the path of movement of the needles. The manner in which the needles loops are taken from the needles, retained until the next reciprocation of the needles and then cast off will be described hereinafter. The loop takers are moved into and out of operative position on starting and stopping the machine, and are reciprocated while the machine is in operation to cooperate with the needles in forming the lacings by mechanism which reciprocates the rods 140 at the forward ends of which the loop takers are mounted. The connections for reciprocating the rods 140 comprise a rectangular horizontal bar 142 (see Fig. 5) at the upper part of the machine to which the ends of the rods 140 are connected. The ends of the bar 142 are supported in flanged blocks 144 by means of threaded studs 146 (see Fig. 6) passing loosely through the blocks and into the ends of the bar 142. The blocks 144 are mounted loosely with their flanges at the inner sides of the forked upper ends of a pair of arms 148 and 150 fixed to a shaft supported in the machine frame. The arm 148 at the left side of the machine is connected to be actuated by a cam slot in the gear 52. The gear 52 rotates three times during each complete cycle of operations of the machine, and the shape of the cam slot is such that the loop takers are maintained in the proper position with relation to the needles, as the needle carriers move back and forth transversely to the reciprocation of the needles, and the required reciprocating movements are imparted to the loop takers to cause them to cooperate with the needles in forming the lacings.

To enable the loop takers to take the loops from the needles, retain the loops in the path of the needles during their next reciprocation and then cast off these loops and engage the newly presented loops on the needles, each loop taker is provided with two sets of points, one set of points being arranged to engage and spread a needle loop during the reciprocation of the loop taker in one direction and the other set of points being arranged to engage and spread a needle loop when the loop taker is reciprocated in the opposite direction. The points of one set are indicated at 151 and 152, and the points of the other set at 154 and 156 (see Figs. 7 to 16). The points are so arranged that when the needle associated with the loop taker rises to its highest position, the upper end of the needle will lie between and a little to one side of the path of reciprocation of the points. The loop on the needle is entered first by one of the fingers 152, 156 and in order to permit the points to enter the loop, the needle is cut away at one side for a short distance below the eye, as clearly shown in Fig. 10. In addition to taking the loops from the needles, the points 152 and 156 are also utilized in cooperation with the points 151 and 154 to spread the loop and hold it in the path of the needle during its next reciprocation. For convenience of description, therefore, the points 152, 156 will hereinafter be referred to as loop spreader points, and the points 151, 154 will be referred to as loop holder points. The loop holder points 151 and 154 are formed on arms extending downwardly from the main frame block of the loop taker and project towards each other in position to enter the needle loop as one side of the loop is forced outwardly away from the needle by the action of a loop spreader point. The loop spreader points 152, 156 extend slightly above and beyond the points 151, 154, and in order that they may cooperate with the points 151, 154 in spreading the needle loops, they are formed on a frame or carrier 158 secured to a rock shaft 160 which extends in parallel relation to the rod 140 and is mounted to rotate in the loop taker block 30 and to rotate and slide longitudinally in a frame plate 162. The rock shaft 160 is acted upon by a spring 164 coiled around the shaft with one end engaging a slot in the end of the shaft, and with the other end engaging a pin on the loop taker block, the arrangement of the spring being such that it tends to turn the shaft in a counter-clockwise direction, as viewed in Figs. 9, 10 and 11, and hold the loop spreader fingers in substantially alined position indicated in Fig. 10. The rock shaft 160 is rotated in a clockwise direction to move the loop spreading fingers into the position indicated in Fig. 11 to spread the loop by mechanism hereinafter described.

In order to insure that the loop spreader points will properly engage the needle loops during the reciprocations of the loop taker blocks, each loop taker is provided with a point locating device which cooperates with the needle to determine accurately the position of the loop spreader points as they enter the needle loop. This point locating device consists of a guide plate 166 loosely mounted at its upper end on the shaft 160 within a slot at the upper portion of the block carrying the spreader points and at its lower end provided with a surface arranged to engage the needle when in its highest position. At its upper end the guide plate is formed with a bevelled face 168 (see Fig. 12) which is engaged by the end of a set screw 170 threaded through an upstanding lug on the block carrying the spreader points. During the movement of the rock shaft 160 in a counter-clockwise direction, under the force of the spring 164, the guide plate is moved yieldingly with the loop spreader point carrier 158 by the engagement of the set screw 170 with the bevel face 168. The movement of the plate is stopped by the engagement of the plate with the needle, as indicated in Figure 10, and while the plate is in engagement with the needle, it acts by reason of the engagement of the bevel face 168 with the set screw 170 to prevent further counter-clockwise movement of the carrier for the loop spreader points and locates the points in proper position with relation to the needle so that during the reciprocation of the loop taker block the points will enter with certainty into the needle loop. On the return movement of the rock shaft 160 in a clockwise direction, which movement takes place after the needle has been retracted, the loop spreader points are moved to the position indicated in Fig. 11 to spread the loop, and during this movement, the carrier 158 for the points engages the plate 166 and moves it away from the path of the needle a short distance.

The loop taker points 151 and 152 engage a loop on the needle during the rearward reciprocating movement of the loop taker and the loop taker points 154 and 156 engage a needle loop during the forward reciprocating movement of the loop taker. During the forward reciprocation from the position illustrated in Fig. 13, the loop is entered first by the point 152 and then by the point 151. During the continued rearward movement of the loop taker, the loop is carried rearwardly, and after the needle is withdrawn, the loop is spread by the transverse movement of the points 152 so that the loop extends over the holding point 151 and the spreader point 156 is in position to be entered by the needle during its next upward stroke. During the return forward movement of the loop taker, the loop on the fingers 152, 151 is engaged by the needle and cast off of the points, as indicated in Figure 15, and the new loop presented by the needle is engaged and spread by the points 154, 156 as indicated in Figure 16.

To actuate the loop spreader points away from the looper points in spreading each loop, a T-shaped arm 174 is mounted on the central part of each looper shaft 160 (see Figs. 1, 4, 5 and 6), the arms 174 extending upwardly and to the left. Above the arms 174 there is a rod 176 mounted at its right end in a downwardly extending arm of a lever 178 secured to a shaft 180 having bearings in upstanding lugs of the machine frame, and arranged parallel to a brace bar 182, connecting the sides of the machine frame. On the left end of the shaft 180 is mounted an arm 184 for supporting the rod 176. When the rod 176 is moved against the T-shaped arm 174, the loop spreaders are moved towards the right to positions indicated in Figs. 9 and 11. When the rod 176 is raised, the springs 164 cause a return movement of the loop spreaders to positions indicated in Fig. 10. The shaft 180 is rocked at suitable times by a link 186 pivotally connected with an upwardly extending arm of a lever actuated by a cam secured to the main shaft 16 which rotates six revolutions for each complete operation of the machine.

The take-up 32 comprises a pair of arms fastened to a shaft 188 by screws 190 and provided between their upper ends with a pair of parallel rods 192. The cords are carried between the rods to prevent displacement. The central part of the right arm of the take-up is connected by a link 194 with a downwardly extending arm of a lever 196 rotatable on a shaft 198 (see Fig. 1), the upwardly extending arm of which lever is actuated by a cam carried by the shaft 54. The action of the take-up 32 is such as to facilitate movement of the cords through the eyes of the needles and to cause the previously formed loops of cords to be drawn tightly against the loops by the action of the loop takers.

To complete the lacing, after the final needle loops are transferred to the loop takers, the bight portion of each final loop is severed between the loop taker and the eyelets by the cutter knives 34 (see Figs. 39 and 40). To actuate the cutters, which are in the form of rectangular bars slidably mounted in the frame of the machine, the upper end of each cutter bar is bent at right angles and fitted loosely within a diametrical slot formed in a horizontal rod 200 (see Figs. 5 and 6). The rod 200 is supported at its right end in an upwardly extending arm of a lever 202 having an elongated hub fulcrumed loosely on a horizontal shaft 204 (see Fig. 1). The left end of the rod 200 is secured to the upper end of another upwardly extending arm 206 whose hub portion is integrally connected with the hub of the lever 202. The lever 202 carries on a downwardly extending arm a cam roll engaging a cam slot formed in a cam secured to the cam shaft 54, as more fully described in the application above referred to.

When the machine is stopped, the positions of certain of the operating devices are changed to facilitate release of the laced upper and to position a new upper in place. Thus, the loop takers which, during operation of the machine, are directly above the ends of the needles, are raised by sliding the supporting rods 140 upwardly and towards the rear of the machine, the clamp jaw 28 and the individual clamping members 80 are moved downwardly from the upper to a position shown in Fig. 5, the upper clamp jaw 26 and the transverse rod 82 secured thereon are raised out of the way and the needle carriers 38 are moved downwardly and outwardly in order to expose the needles.

The loop takers are raised from operating positions by their actuating cam on the shaft 54, which makes a single complete revolution during operation of the machine, and the gripper jaw 28 and the individual clamping members 80 are lowered from clamping positions by their connections with their respective cams on the shaft 54. At about the same time, and just before the machine comes to rest, the upper jaw 26 and the cross bar 82 are raised by the connections to the driving and stopping mechanism.

Figure 17:
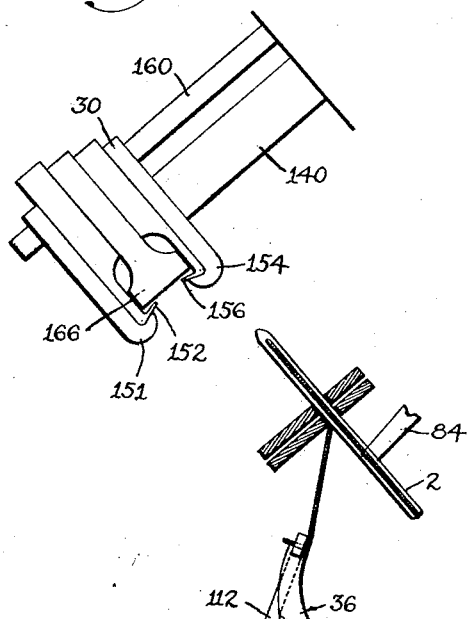
Figure 18:
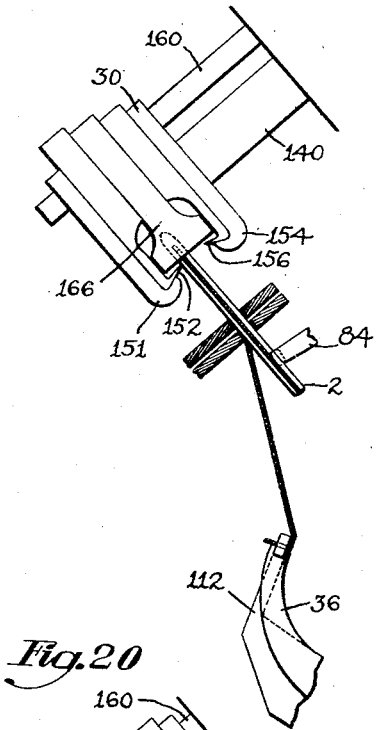

When the machine is at rest, the parts are in the position shown in Figures 1 and 4, with the clamp jaw 26 raised, the needles in their outer position and the loop takers in their rearward position to facilitate applying the eyelets of the upper to the individual needles. After the upper is applied to the machine, the treadle is depressed, causing the clamp jaw 26 with the rod 82 to be lowered to the position indicated in Figure 5. As the machine is started into operation, the needles are brought to their operative position, as indicated in Figures 5 and 17, the lower clamp jaw 28 and the individual clamping members 80 are raised to clamp the upper against the under side of the upper clamp jaw 26 and bar 82, the loop takers are moved downwardly and forwardly in position to cooperate with the needles (Fig. 17) and the needles are projected upwardly into alignment with the loop taker points (Fig. 18). The relations of the upper to the clamping jaws and clamping members at this point are more clearly illustrated in Figure 6.

Figure 19:
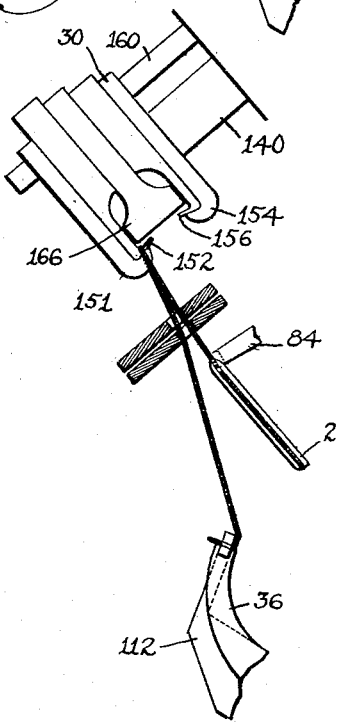
Figure 20:
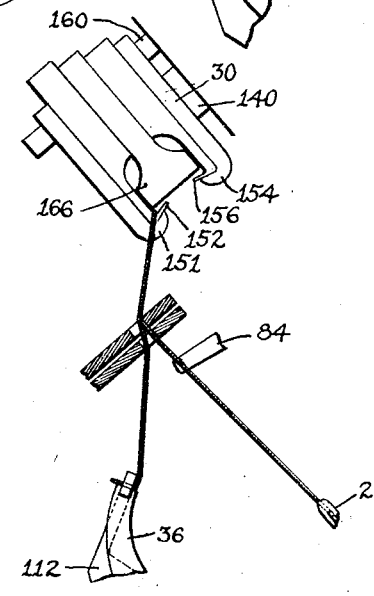
Figure 21:
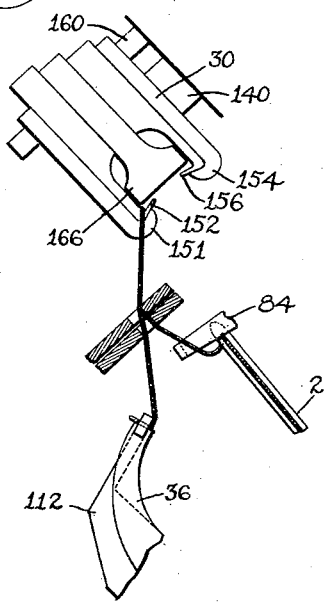
Figure 22:
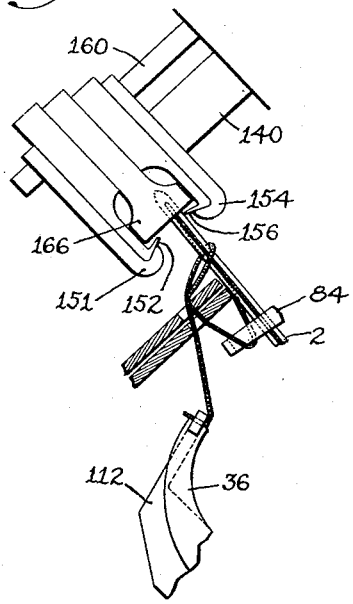
Figure 23:
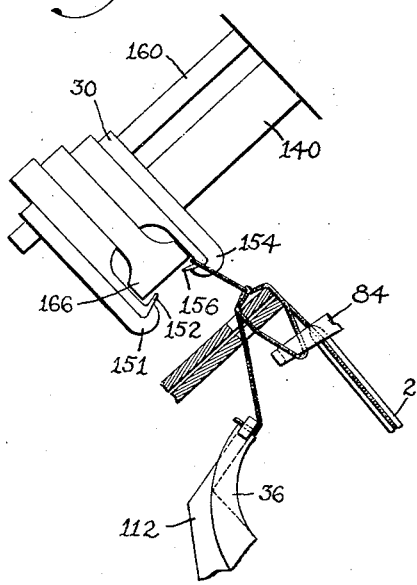
Figure 24:
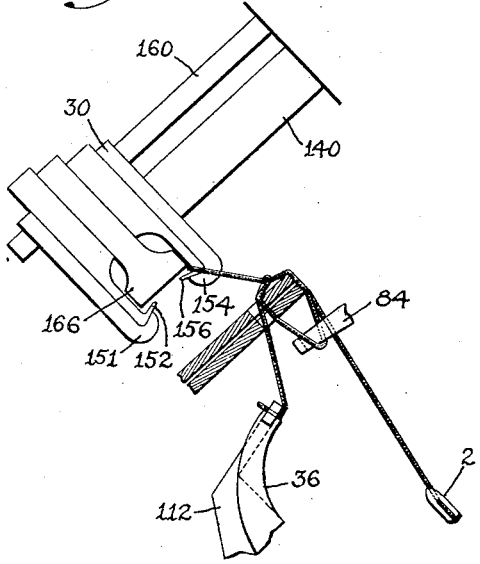
Figure 25:
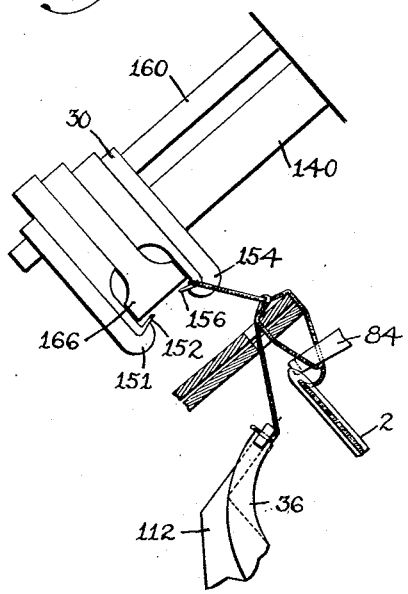
Figure 26:
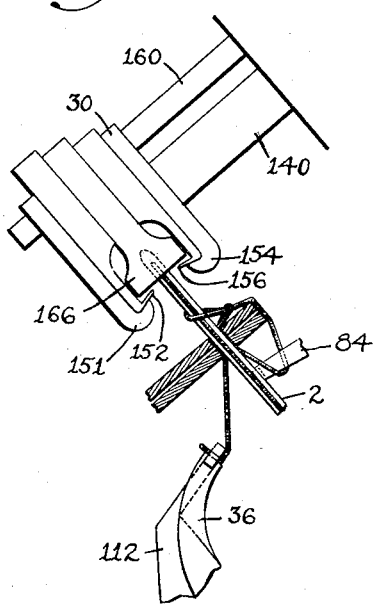
Figure 27:
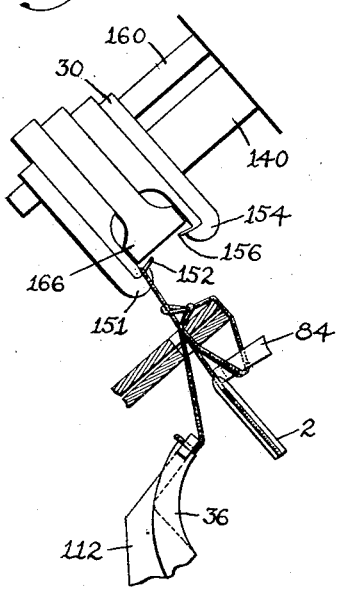
Figure 28:
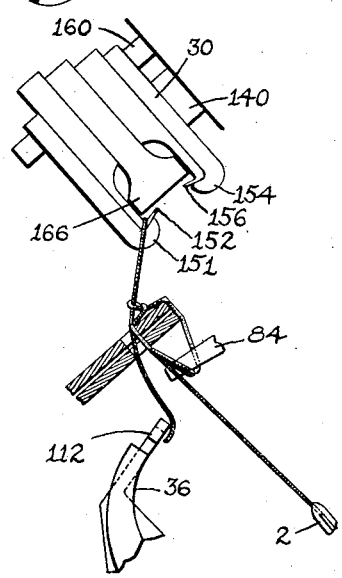
Figure 29:
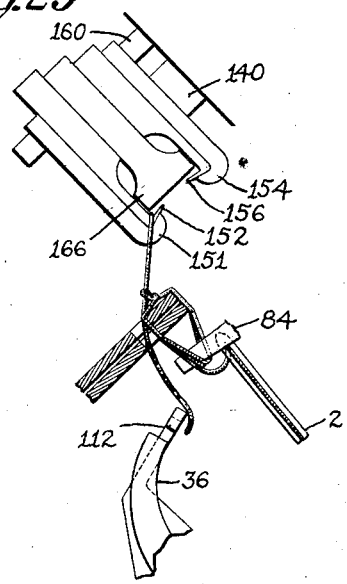
Figure 30:
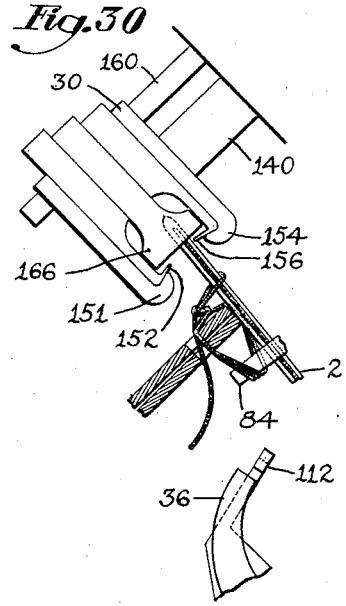
Figure 31:
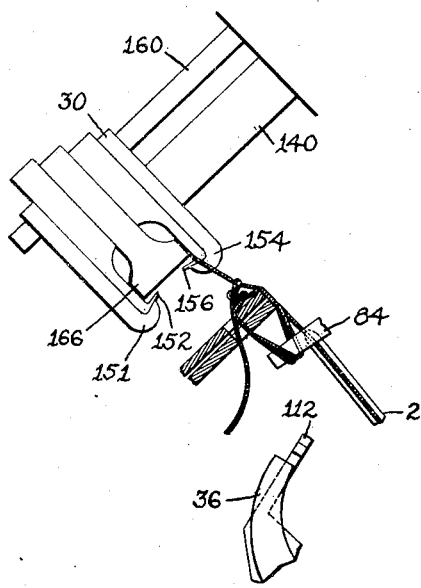
Figure 32:
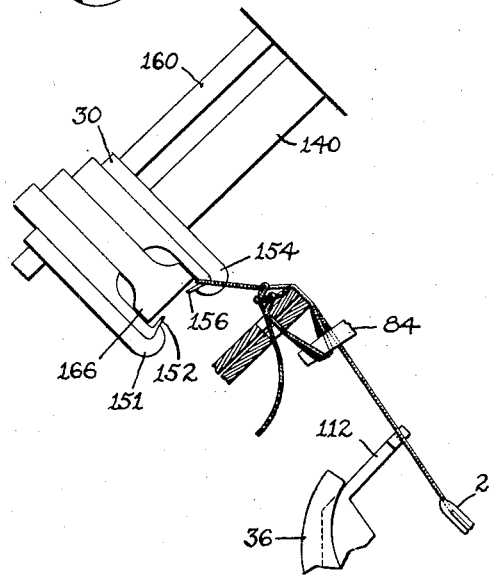

As the needles enter the loop takers, as shown in Fig. 18, the loop takers are moved rearwardly, causing the loops of cord to be engaged and held. During the retracting movement of the needles, the first part of which is illustrated in Figure 19, the grippers 36 are moved towards the clamped upper into the position shown in Figure 20 to bring the clamped ends of the cord close to the eyelets. The needle carriers and the loop takers are raised rearwardly and the needles pass across the edges of the upper during the succeeding reciprocation, the first part of which is illustrated in Figure 21. As the needles approach the loop takers, they enter the spread loops first held by the looper and spreader points and the loop takers are then moved forwardly (Figure 22). In moving forwardly, the first loops are cast off from the loop takers by contact with the needles, the cord having been passed around the angularly disposed ends of the measuring fingers 84 to provide suitable separation in the completely laced upper and drawn tightly against the top surface of the upper by continued movements of the loopers. After the first loop is cast off the loop takers, the second loops are engaged and held thereby and the needles retracted as shown in Figure 23. Figure 24 illustrates the parts in their positions as the needles begin their third reciprocation. Just before the needles enter the eyelets in the third reciprocation, the cords are brought again around the cord measuring fingers 84, as indicated in Figure 25. To release the second loop from the loop takers (see Fig. 26), the loop taker is moved a short distance rearwardly. The loop takers then move still further rearwardly, as in Figure 27, to engage and hold the third loops of cord, the second loops being drawn tight by this movement. As the needles reach approximately their lowest positions after their third reciprocation, the cord end grippers are actuated to release the ends of cord, as in Figure 28. Thereafter, the needles complete their fourth reciprocation across the edges of the upper, indicated in the step-by-step positions of Figures 29, 30 and 31. When the needles reach the lower limits of their fourth reciprocating movement, as in Figure 32, the hook members 112 of the grippers are raised past the lengths of cord extending between the uppers and the needle eyelets, the gripper members 36 being held at the front of the cords by the rod 134. During the fifth upward movement of the needles, the hook members are held stationary (Fig. 33) and the needles pass through the fourth loops (Fig. 34). After the needles are withdrawn from the eyelets (Figs. 35 and 36) and move below the level of the grippers (Figs. 37 and 38), the hook members 112 are again lowered to a gripping position, drawing the cords with them.

At this point in the operation of the machine, the cutter knives 34 are projected forwardly and downwardly against the sides of the loops held by the loop takers between the loop takers and the eyelets, as shown in Figs. 39 and 40. As soon as the cords are cut, the lower clamping members 80 are moved downwardly to release the upper and the upper drops from the machine. As the clamping members 80 move downwardly, as in Fig. 5, and after the upper has dropped from the machine, they engage the underlying portions of the thread measuring fingers and force these downwardly in case the fingers have not dropped of their own weight.

After the lacing cords are severed, as illustrated in Figure 39, a long length of lacing cord is left projecting from the eye of each needle. To draw this length of cord backwardly through the eye of the needle and leave only a short cord end projecting beyond the jaws of the thread gripper, a sixth and final upward stroke is imparted to the needles. During this final upward stroke of the needles, the hook members 112 of the grippers are raised slightly to release the lacing cords and the upward movement of the needles causes the cord ends projecting through the eyes of the needles and the grippers to be withdrawn through the needle eyes and through the grippers until the ends are close to the grippers, as indicated in Figure 41. The cam on the shaft 54 from which the loop takers are reciprocated is so formed that the loop takers are not actuated to engage the needle loops during the final reciprocation of the needles so that, when the needles are retracted, the loops remain on the needles. During the final downward movement of the needles, the cord ends are held by the grippers and the cords are withdrawn by the take-up through the eyes of the needles which return to the position indicated in Figure 42.

As the machine stops, the needle carriers are moved downwardly and forwardly to bring them into their rest position, as indicated in Figure 43, the loop takers are moved upwardly and rearwardly to their inoperative position, and the upper clamping jaw 26 is raised to its highest position, leaving all parts of the machine ready to receive a new upper.

The nature and scope of the invention having been indicated, what is claimed is:

1. A method of lacing shoe uppers which comprises passing a loop of lacing cord through a pair of aligned eyelet holes of a folded shoe upper, thereafter passing loops of the same cord alternately across the edges and through said pair of aligned eyelet holes of the shoe upper, passing each loop through the preceding loop to lock the loops, pulling on the cord to tighten the loops, and measuring the length of cord between the tightened loops to provide a predetermined amount of slack in the lacing which thus takes the form of a self-sustaining ring arranged to permit the eyeleted edges of the upper to be relatively moved thereon into open position for application to a last with the portions adjacent the lacing slit lying flat against the last.

2. A method of lacing shoe uppers which comprises passing a loop of lacing cord through a pair of aligned eyelet holes of a folded shoe upper, thereafter passing loops of the same cord alternately across the edges and through said pair of aligned eyelet holes of the shoe upper, and passing each loop through the preceding loop to lock the loops, and taking up on the cord after the passing of each loop through the preceding loop to tighten the loops while leaving sufficient slack in the lacing which takes the form of a self-sustaining ring arranged to permit opening out of the upper on the lacing thus formed for application to a last with the portions adjacent the lacing slit lying flat against the last.

3. A method of lacing shoe uppers which comprises passing a loop of lacing cord through a pair of aligned eyelet holes of a folded shoe upper, thereafter passing loops of the same cord alternately across the edges and through said pair of aligned eyelet holes, passing each loop through the preceding loop to lock the loops, and exerting a pull on each loop passed through a preceding loop to tighten said preceding loop to form a self-sustaining lacing ring on which the eyeleted edges of the uppers can be relatively moved to open position.

JOSEPH FOSSA.